(12) United States Patent
Huber et al.

(10) Patent No.: US 6,574,615 B1
(45) Date of Patent: Jun. 3, 2003

(54) SYSTEM AND METHOD FOR MONITORING SUPPORT ACTIVITY

(75) Inventors: Gary D. Huber; Ganapathi S. Lakshminarayanan, both of Austin, TX (US)

(73) Assignee: Dell USA, L.P., Round Rock, TX (US)

( * ) Notice: Subject to any disclaimer, the term of this patent is extended or adjusted under 35 U.S.C. 154(b) by 0 days.

(21) Appl. No.: 09/413,523

(22) Filed: Oct. 6, 1999

(51) Int. Cl.[7] .............................................. G06F 17/30
(52) U.S. Cl. ................................ 707/1; 707/2; 707/104
(58) Field of Search .............................. 707/2, 204, 10, 707/104, 203, 1, 8; 705/11; 345/338

(56) References Cited

U.S. PATENT DOCUMENTS

| 4,253,178 A | 2/1981 | Kolaczia ..................... 368/285 |
| 4,438,458 A | 3/1984 | Munscher .................... 358/254 |
| 4,627,060 A | 12/1986 | Huang et al. ................. 371/62 |
| 4,788,658 A | 11/1988 | Hanebuth .................... 364/900 |
| 4,809,280 A | 2/1989 | Shonaka ....................... 371/62 |
| 4,964,077 A | 10/1990 | Eisen et al. .................. 364/900 |
| 5,010,551 A | 4/1991 | Goldsmith et al. ......... 371/16.4 |
| 5,017,030 A | 5/1991 | Crews ......................... 400/485 |
| 5,060,135 A | 10/1991 | Levine et al. ............... 364/200 |
| 5,196,993 A | 3/1993 | Herron et al. .............. 361/393 |
| 5,214,695 A | 5/1993 | Arnold et al. .................. 380/4 |
| 5,224,024 A | 6/1993 | Tu et al. ...................... 364/429 |
| 5,228,655 A | 7/1993 | Garcia et al. ............... 248/118 |
| 5,276,805 A | 1/1994 | Hamaguchi ................. 395/164 |
| 5,287,505 A | 2/1994 | Calvert et al. .............. 395/600 |
| 5,325,521 A | 6/1994 | Koyama et al. ............ 375/575 |
| 5,346,410 A | 9/1994 | Moore, Jr. ................... 439/607 |
| 5,348,408 A | 9/1994 | Gelardi et al. .............. 400/715 |
| 5,353,240 A | 10/1994 | Mallory et al. ............. 702/186 |
| 5,355,357 A | 10/1994 | Yamamori et al. ......... 369/75.2 |
| 5,356,099 A | 10/1994 | Sereboff .................... 248/118.1 |
| 5,367,667 A | 11/1994 | Wahlquist et al. .......... 395/575 |
| 5,374,018 A | 12/1994 | Daneshvar ................... 248/118 |
| 5,375,800 A | 12/1994 | Wilcox et al. .............. 248/118 |
| 5,381,526 A | 1/1995 | Ellson ......................... 395/164 |
| 5,388,032 A | 2/1995 | Gill et al. ................... 364/146 |
| 5,390,324 A | 2/1995 | Burckhartt et al. ......... 395/575 |
| 5,392,095 A | 2/1995 | Siegel ......................... 355/200 |
| 5,398,333 A | 3/1995 | Schieve et al. ............. 395/575 |
| 5,410,447 A | 4/1995 | Miyagawa et al. ......... 361/681 |
| 5,422,751 A | 6/1995 | Lewis et al. ................... 359/83 |
| 5,423,605 A | 6/1995 | Liu ........................... 312/265.6 |
| 5,432,927 A | 7/1995 | Grote et al. ................ 395/575 |
| 5,443,237 A | 8/1995 | Stadtmauer ............... 248/441.1 |
| 5,454,080 A | 9/1995 | Fasig et al. ................. 395/283 |
| 5,455,933 A | 10/1995 | Schieve et al. ........ 395/183.03 |
| 5,471,674 A | 11/1995 | Stewart et al. .............. 395/650 |

(List continued on next page.)

FOREIGN PATENT DOCUMENTS

| GB | 2065939 | 7/1981 | ........... G06F/11/30 |
| GB | WO 98/18086 | 4/1998 | ........... G06F/17/30 |
| GB | 2329266 | 3/1999 | ........... G06F/11/00 |
| GB | 2356271 | 5/2001 | ........... G06F/11/00 |
| WO | WO 93/00628 | 1/1993 | ............. G06F/1/24 |
| WO | WO 94/08289 | 4/1994 | ........... G06F/9/445 |
| WO | WO 97/09676 | 3/1997 | |

OTHER PUBLICATIONS

Great Britain Search and Examination Report 0019866.3, Mar. 12, 2001.

(List continued on next page.)

*Primary Examiner*—Sanjiv Shah
(74) *Attorney, Agent, or Firm*—Baker Botts L.L.P.

(57) ABSTRACT

The present invention discloses a computer system for measuring and monitoring local client support activity associated with servicing and supporting a computer by a client. The system includes a local client support activity file in the local computer, the local client support activity file records local client support activity. The local client support activity file is further operable to be uploaded when the client contacts a support center using the local computer.

17 Claims, 2 Drawing Sheets

U.S. PATENT DOCUMENTS

| | | | |
|---|---|---|---|
| 5,483,437 A | 1/1996 | Tang | 363/146 |
| 5,503,484 A | 4/1996 | Louis | 400/489 |
| 5,513,319 A | 4/1996 | Finch et al. | 395/185.08 |
| 5,522,572 A | 6/1996 | Copeland et al. | 248/118 |
| 5,526,180 A | 6/1996 | Rausnitz | 359/609 |
| 5,530,847 A | 6/1996 | Schieve et al. | 395/183.14 |
| 5,537,585 A | 7/1996 | Blickenstaff et al. | 395/600 |
| 5,537,618 A | 7/1996 | Boulton et al. | 395/161 |
| 5,547,154 A | 8/1996 | Kirchoff et al. | 248/118.3 |
| 5,547,272 A | 8/1996 | Paterson et al. | 312/223.2 |
| 5,564,054 A | 10/1996 | Bramnick et al. | 395/700 |
| 6,061,810 A | 12/1996 | Potter | 714/23 |
| 5,592,362 A | 1/1997 | Ohgami et al. | 361/686 |
| 5,596,481 A | 1/1997 | Liu et al. | 361/683 |
| 5,596,482 A | 1/1997 | Horikoshi | 361/683 |
| 5,627,964 A | 5/1997 | Reynolds et al. | 395/183.22 |
| 5,668,992 A | 9/1997 | Hammer et al. | 395/651 |
| 5,678,002 A | 10/1997 | Fawcett et al. | 395/183.01 |
| 5,680,640 A | 10/1997 | Ofek et al. | 395/839 |
| 5,689,253 A | 11/1997 | Hargreaves et al. | 341/22 |
| 5,689,706 A | 11/1997 | Rao et al. | 395/617 |
| 5,694,293 A | 12/1997 | Seto et al. | 361/687 |
| 5,708,812 A | 1/1998 | Van Dyke et al. | |
| 5,724,224 A | 3/1998 | Howell et al. | 361/680 |
| 5,727,163 A | 3/1998 | Bezos | 705/27 |
| 5,732,268 A | 3/1998 | Bizzarri | 395/652 |
| 5,748,877 A | 5/1998 | Dollahite et al. | 395/183.12 |
| 5,759,644 A | 6/1998 | Stanley | 428/14 |
| 5,768,370 A | 6/1998 | Maatta et al. | 379/433 |
| 5,775,822 A | 7/1998 | Cheng | 400/489 |
| 5,778,372 A | 7/1998 | Cordell et al. | 707/100 |
| 5,790,796 A | 8/1998 | Sadowsky | 395/200.51 |
| 5,796,579 A | 8/1998 | Nakajima et al. | 361/683 |
| 5,797,281 A | 8/1998 | Fox | 63/12 |
| 5,803,416 A | 9/1998 | Hanson et al. | 248/118 |
| 5,805,882 A | 9/1998 | Copper et al. | 395/652 |
| 5,809,248 A | 9/1998 | Vidovic | 395/200.49 |
| 5,809,511 A | 9/1998 | Peake | 707/204 |
| 5,818,635 A | 10/1998 | Hohn et al. | 359/612 |
| 5,819,274 A | 10/1998 | Jackson, Jr. | 707/10 |
| 5,825,355 A | 10/1998 | Palmer et al. | 345/336 |
| 5,825,506 A | 10/1998 | Bednar | 358/402 |
| 5,826,839 A | 10/1998 | Chen | 248/118 |
| 5,832,522 A | 11/1998 | Blinkenstaff et al. | 707/204 |
| 5,835,344 A | 11/1998 | Alexander | 361/683 |
| 5,845,136 A | 12/1998 | Babcock | 395/750.01 |
| 5,852,545 A | 12/1998 | Pan-Ratzlaff | 361/683 |
| 5,854,828 A | 12/1998 | Kocis et al. | 379/93.31 |
| 5,860,001 A | 1/1999 | Cromer et al. | 395/651 |
| 5,860,002 A | 1/1999 | Huang | 395/652 |
| 5,860,012 A | 1/1999 | Luu | 395/712 |
| 5,861,884 A * | 1/1999 | Fujioka | 345/338 |
| 5,881,236 A | 3/1999 | Dickey | 395/200.51 |
| 5,884,073 A | 3/1999 | Dent | 395/652 |
| 5,894,571 A | 4/1999 | O'Connor | 713/2 |
| 5,904,327 A | 5/1999 | Cheng | 248/118.1 |
| 5,905,632 A | 5/1999 | Seto et al. | 361/683 |
| 5,906,506 A | 5/1999 | Chang et al. | 439/500 |
| 5,909,544 A | 6/1999 | Anderson, II et al. | 395/200.38 |
| 5,939,694 A | 8/1999 | Holcomb et al. | 235/381 |
| 5,953,533 A | 9/1999 | Fink et al. | 395/712 |
| 5,955,797 A | 9/1999 | Kim | 307/150 |
| 5,960,204 A | 9/1999 | Yinger et al. | 395/712 |
| 5,960,411 A | 9/1999 | Hartman et al. | 705/26 |
| 5,963,743 A | 10/1999 | Amberg et al. | 395/712 |
| 5,974,546 A | 10/1999 | Anderson | 713/2 |
| 5,978,911 A | 11/1999 | Knox et al. | 713/1 |
| 5,991,543 A | 11/1999 | Amberg et al. | 395/712 |
| 5,995,757 A | 11/1999 | Amberg et al. | 395/712 |
| 6,006,344 A | 12/1999 | Bell, Jr. | 714/37 |
| 6,012,154 A | 1/2000 | Poisner | 714/55 |
| 6,014,744 A | 1/2000 | McKaughan et al. | 713/2 |
| 6,032,157 A | 2/2000 | Tamano et al. | 707/104 |
| 6,034,869 A | 3/2000 | Lin | 361/686 |
| 6,038,597 A | 3/2000 | Van Wyngarden | 709/219 |
| 6,047,261 A * | 4/2000 | Siefert | 705/11 |
| 6,048,454 A | 4/2000 | Howell et al. | 361/686 |
| 6,049,342 A | 4/2000 | Nielson et al. | 345/473 |
| 6,050,833 A | 4/2000 | Danzyger et al. | 439/92 |
| 6,061,788 A | 5/2000 | Reynaud et al. | 713/2 |
| 6,104,874 A | 8/2000 | Branson et al. | 717/108 |
| 6,108,697 A | 8/2000 | Raymond et al. | 709/218 |
| 6,112,320 A | 8/2000 | Dien | 714/51 |
| 6,113,050 A | 9/2000 | Rush | 248/346.01 |
| 6,166,729 A | 12/2000 | Acosta et al. | 345/327 |
| 6,167,383 A | 12/2000 | Henson | 705/26 |
| 6,167,532 A | 12/2000 | Wisecup | 714/23 |
| 6,182,212 B1 | 1/2001 | Atkins et al. | 713/1 |
| 6,182,275 B1 | 1/2001 | Beelitz et al. | 717/1 |
| 6,199,204 B1 | 3/2001 | Donohue | 717/11 |
| 6,202,207 B1 | 3/2001 | Donohue | 717/11 |
| 6,226,412 B1 | 5/2001 | Schwab | 382/232 |
| 6,236,901 B1 | 5/2001 | Goss | 700/95 |
| 6,247,126 B1 | 6/2001 | Baelitz et al. | 713/1 |
| 6,256,620 B1 * | 7/2001 | Jawahar et al. | 707/2 |
| 6,263,215 B1 | 7/2001 | Patton et al. | 455/561 |
| 6,272,484 B1 | 8/2001 | Martin et al. | 707/1 |
| 6,279,156 B1 | 8/2001 | Amberg et al. | 717/11 |
| 6,331,936 B1 | 12/2001 | Hom et al. | 361/686 |
| 6,356,977 B2 | 3/2002 | Ofek et al. | 711/112 |
| 6,385,737 B1 | 5/2002 | Benignus et al. | 714/22 |
| 6,393,586 B1 | 5/2002 | Sloan et al. | 714/25 |
| 6,449,735 B1 | 9/2002 | Edwards et al. | 714/25 |

OTHER PUBLICATIONS

Compaq Computer Corporation, Press Release, "New PCs Offer Equipment, Colour and Personality; Compaq's Presario Range Opened Up for Customisation" at Internet >http://biz.yahoo.com/prnews/000719/compaq_new.html<, printed Jul. 24, 2000.

Compaq Computer Corporation, "Home and Home Office Computing, My Style" at internet >wysiwyg://3/http://athome.compaq.com/showroom/static/splash.asp<, printed Jul. 18, 2000.

Epson, "Epson Stylus Color 74i It makes a Colorful Case for Being Your iMac Printer" at Internet >http://www.epson.com/printer/inkjet/sty740i.htm<, printed Jul. 24, 2000.

Radio Shack, advertisement, p. 2 Aug. 20, 2000.

Pending Patent Application Serial No. 09/236,862: Alan E. Beelitz, Richard D. Amberg; "Recoverable Software Installation Process and Apparatus for a Computer System"; Dell USA, L.P., Filed, Jan. 25, 1999.

Pending Patent Application 09/245,148: Jeffrey N. Sloan, Tim Sullivan, David S. Springer, "Method and Apparatus for Diagnosing and Coveying an Identification Code in Post on a Non–Booting Personal Computer"; Dell USA, L.P., Filed Feb. 4, 1999.

* cited by examiner

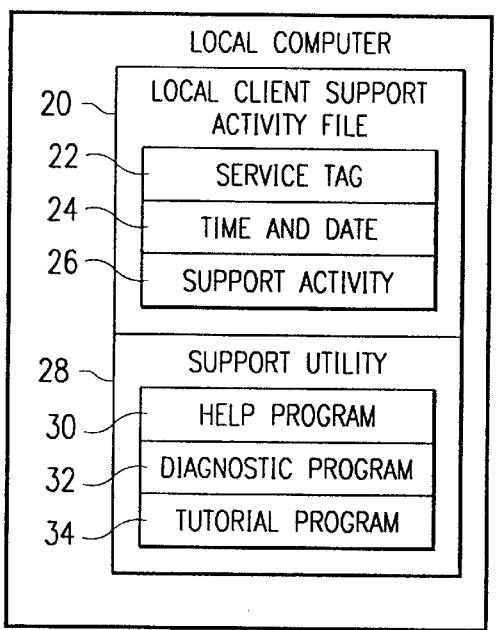
FIG. 1
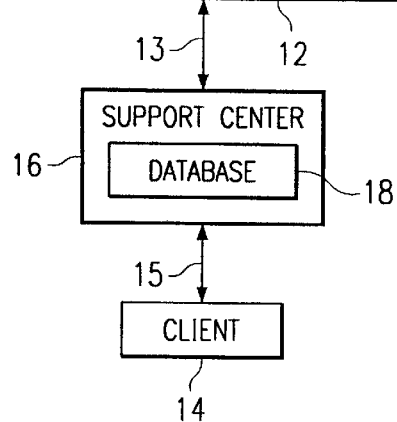
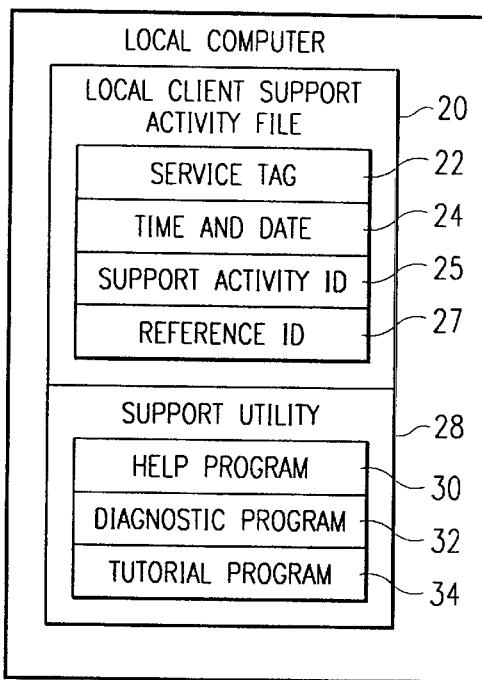
FIG. 2
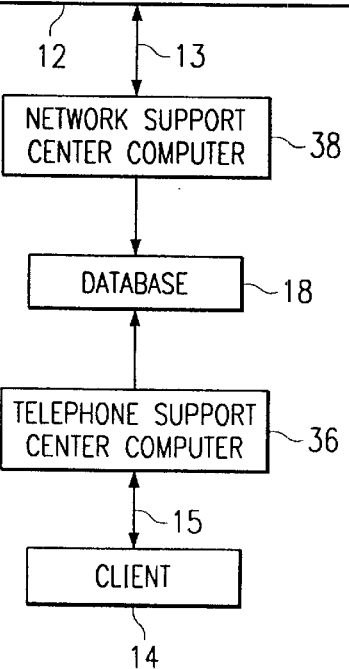

SYSTEM AND METHOD FOR MONITORING SUPPORT ACTIVITY

TECHNICAL FIELD

This invention relates in general to the field of electronic devices. More particularly, this invention relates to the field of monitoring support activity within the computer industry.

BACKGROUND

Many computer manufacturers and software makers provide a variety of support services to their clients and customers. These support services often include local support utilities loaded on a client's computer including help programs, tutorial programs, and diagnostic programs to assist clients who purchase their systems. These support utilities are often designed to be user friendly; when a client experiences a problem or has questions, he can simply use one of these support utilities to find a solution to his problem or answers to his questions. Additionally, computer manufactures and software makers often provide more direct assistance to clients in the form of support centers. When a client experiences a problem or has questions relating to his computer system the client may contact a customer support center and communicate with a technical support representative. The technical support representative may then address the client's specific problems or concerns.

Maintaining a support center is often expensive and burdensome. A support center must be staffed with competent technical support representatives who have access to the appropriate support utilities. The staff must receive training to maintain competence with changing technology. Managing a support center is often challenging because the number of clients who contact the support center at any given time can be unpredictable. When a support center is understaffed, a client telephoning a support center may be left to wait for assistance for a lengthy period. This often leads to a client frustration and dissatisfaction. When a support center is overstaffed, valuable time and resources are wasted.

One way to reduce the expense of maintaining support operations is to increase the effectiveness of the support utilities maintained on the client's computer. Clearly, a customer who finds the answer to his question using one of the support utilities loaded in his computer will be less inclined to call a support center to speak with a technical support representative. However, maximizing the effectiveness of support utilities is hampered by the difficulty of measuring how a client or a group of clients make uses of the local support utilities loaded on their computers. A technical support representative may ask a client which local support utilities the client used before contacting the support center, however, this method of gathering data related to local client support activity is ineffective and the data collected may be inaccurate. Additionally, the data collected by this method will likely be limited to the client's present problem and will not delve into past use of local support utilities. Because the client's use of local support utilities takes place independent from the support center, computer and software makers generally have no efficient and reliable way of measuring this support activity.

SUMMARY

Therefore a need has arisen for a method and system for effectively and reliably measuring the use of local support utilities.

A further need exists for a method and system for efficiently gathering data related to local client support activity.

A further need exists for an efficient and reliable method to identify the support steps a particular client has taken prior to contacting a support center.

A further need exists for a method and system for evaluating the effectiveness of local support utilities.

In accordance with teachings of the present disclosure, a system and method are described for monitoring support activity. The system includes a local client support activity file which measures the use of local support utilities such as help programs, diagnostic programs, and tutorial programs. When a client uses one of the support utilities, the activity file records the service tag or another identifier of the computer, the date and time of the support utility use, and records what support utility activity transpired. When the client's computer contacts a support center computer, the local client support activity file may be uploaded into the support center computer and stored in database. Information within the database can then be used to evaluate the effectiveness of the support utilities.

In one aspect of the present invention, a computer system for measuring and monitoring local client support activity associated with servicing and supporting a computer by a client includes a local client support activity file in a local computer. The local client support activity file records local client support activity. Furthermore, the local client support activity file may be uploaded by a support center computer when the client contacts a support center using the local computer. More specifically, the local client support activity file records a service tag for identifying the local computer, a record of the date and time of the local support activity, and a record of the local support activity.

In another aspect of the present invention, a computer system for measuring and monitoring client service and support activity associated with a local computer includes an activity file maintained at the local computer and an activity file maintained at a support center. The computer system also includes a database which has combined information from the local client support activity file and the support center activity file. The support center activity file may comprise record of telephone support activity, a record of electronic support activity such email, or both.

In yet another aspect of the invention a method for tracking support activity associated with a local computer includes the step of recording local support activity at a local computer in a local client support activity file. The method also includes the step of uploading the local client support activity file. More specifically, the local client support activity file may be uploaded into a support center computer and stored in a support center database. More specifically, the support center database may be used to evaluate the effectiveness of local support utilities and support center activities.

The present invention provides a number of important technical advantages. One technical advantage is recording local client support activity in the local client support activity file. Recording the local client support activity provides effective and reliable measurement of the use of local support utilities.

Another technical advantage is the ability of the local client support activity file to be uploaded by a support center computer when the client contacts the support center. Uploading the local client support activity file provides an efficient method for gathering data related to local client support activity.

Another technical advantage is recording a service tag for identifying the local computer, the date and time of the local support activity, and a record of the local support activity. Recording these actions in a local activity file provides an efficient and reliable method of identifying the support steps a particular client took prior to contacting a support center.

Another technical advantage is using the support center database to evaluate the effectiveness of local support utilities. Effective local support utilities can then be expanded while ineffective or rarely used local support utilities may be revised or eliminated.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 1 is a schematic diagram of one embodiment of a system for measuring and monitoring client support activity;

FIG. 2 is a schematic diagram of one embodiment of a system for measuring and monitoring client support activity including a network support center computer and a telephone support center computer.

DETAILED DESCRIPTION

Figure 3:
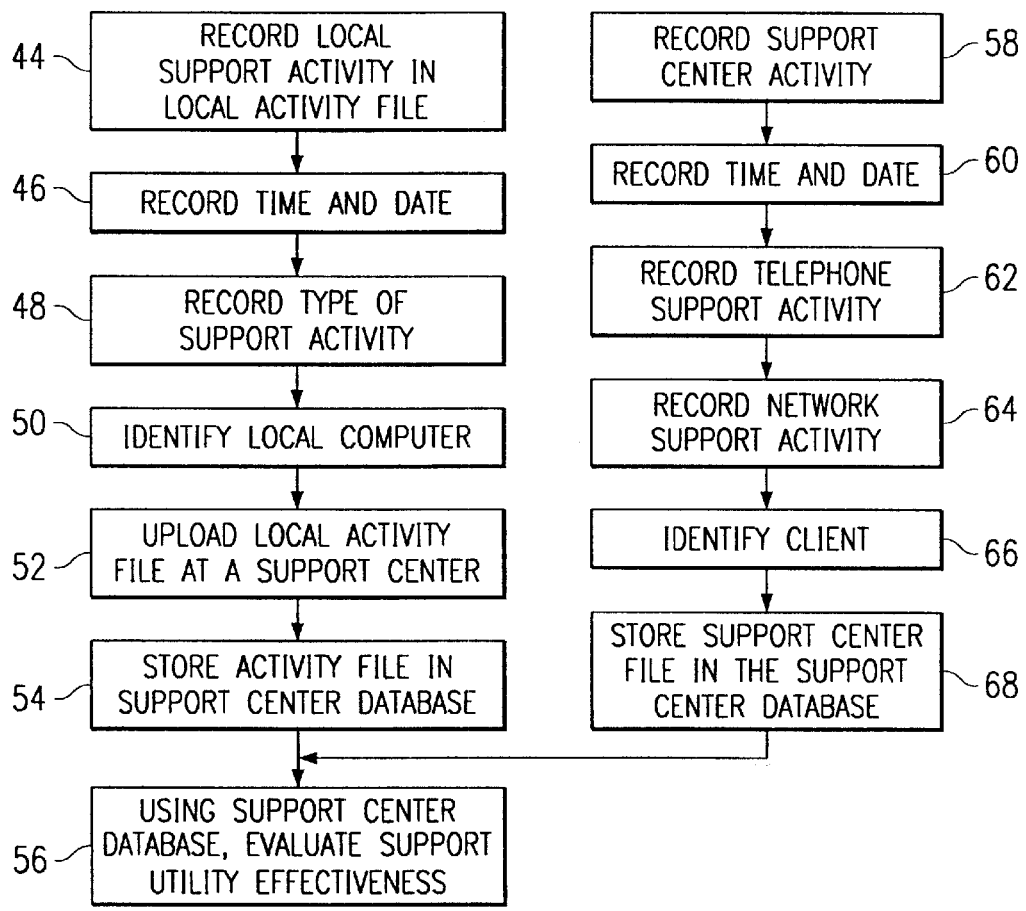
FIG. 3 is a schematic flow diagram showing a method for measuring and monitoring client support activity including recording local support activity and support center activity.

Preferred embodiments and their advantages are best understood by reference to FIGS. 1 through 3, wherein like numbers are used to indicate like and corresponding parts.

FIG. 1 is a schematic diagram of one embodiment of a system indicated generally at 10 for measuring and monitoring client support activity. System 10 includes a local computer 12, and a support center 16. Local computer 12 may comprise, for example, a personal computer, a work station, or any other device with a processor and memory which can be configured to facilitate measuring and monitoring client support activity. Local computer 12 may be operated by a Client 12. Client 12 may comprise an individual using a computer, a business or organization using a computer, or any other computer user. Support center 16 may comprise a support center operated by a computer manufacturer, a software maker, or any other organization or business seeking to provide, monitor, or measure support activity. Support center 16 further comprises a database 18 for storing data related to client support. Database 18 comprises data stored on a computer readable medium.

Local computer 12 may connect to support center 16 by a network 13. Network 13 may comprise the Internet, an intranet, Ethernet, or another suitable network of communication. Network 13 may be selectively connected such that client 14 may selectively connect local computer 12 to support center 16. Client 14 may connect to support center 16 through a connection 15. Connection 15 may comprise any connection such as telephone, cable, or wireless which allows client 14 to directly contact a technical support representative at support center 16. Support center 16 preferably includes at least one server to maintain and operate the connection to network 13.

In a preferred embodiment support center 16 includes at least one server for uploading local client support activity file 20. Support data uploaded by this server may then be preferrably stored in a cumulative local activity log. Additionally, a separate server may be preferably provided for collecting data related to support center activity such as email-based support. This data may be preferably stored in a cumulative remote activity log. The cumulative local activity log and cumulative remote activity log may be stored in database 18.

Local computer 12 may include a local client support activity file 20 and a support utility 28. Local client support activity file 20 connects with support utility 28 such that local client support activity file 20 may record and monitor the use of support utility 28. Local client support activity file 20 preferably includes files for recording a service tag 22 of a local computer an identification of the support activity 26 which was taken and the time and date 24.

The identification of the support activity may include identifying the particular support program indicated by a support activity identification and the particular steps taken indicated by a reference identification. Local client support activity file 20 may further be selectively operable such that a user may disable local client support activity file 20.

Support utility 28 further comprises a help program 30, a diagnostic program 32, and a tutorial program 34. Help program 30 may include frequently asked questions and documentation related to each local computer 12. Diagnostic program 32 may include an automated diagnostic computer which examines particular aspects of local computer 12 for failures or inefficiencies. Diagnostic program 32 may also include flow diagrams or other tools to aid client 14 in diagnosing problems related to local computer 12. Tutorial program 34 may include programs which provide step-by-step and user-friendly instruction to familiarize client 14 with local computer 12, its components, and capabilities.

In operation, when client 14 experiences a problem with local computer 12 or has questions relating to local computer 12, client 14 may use support utility 28. Client 14 may select and use help program 30, diagnostic program 32, or tutorial program 34. After using one or more of these programs client 14 may find the answer to a particular question or solve a particular problem. In this case client 14 may proceed with desired computing activities. When client 14 uses support utility 28, a record of client's activities preferably is created and stored in local client support activity file. A record of the service tag 22 identifying local computer 12, time and date 24 the support activity takes place, and the support activity which takes place is made and stored in local client support activity file 20. When client 14 uses support utility 28 again, another record will be created identifying the time and date 24 and support activity 26 which takes place.

However, in the case that client 14 cannot find a solution to a problem or an answer to a question by using support utility 28, client 14 may contact support center 16 for assistance. Alternatively, client 14 may contact support center 16 without first using support utility 28. Client 14 may contact support center 16 either through connection 15 or network 13. If client 14 contacts support center 16 through connection 15, client 14 may speak directly with a technical support representative. When client 14 speaks with a technical support representative at support center 16, a record may be made identifying which client 14 called for assistance, the problem which he was experiencing and the solution or answer which the customer support representative provided. This record may then be stored in database 18.

Client 14 may contact support center 16 through network 13, using local computer 12. Client 14 may then utilize further support utilities available at support center 16 through network 13. Client 14 may also contact a technical support representative using email or other forms of electronic communication. A record of this support activity may be created at support center 16 and stored in database 18. When client 14 contacts support center 16 by connecting via network 13, support center 16 may upload local client support activity file 12. Local client support activity file 12 may then be transferred to database 18. The data stored in database 18 may be used to evaluate the use and effectiveness of support utility 28. In a preferred embodiment, data stored in database 18 including data from local client activity file 20 and records of electronic support activity and telephone support activity may be combined with existing technical and service data to evaluate the use and effectiveness of support utility 28.

FIG. 2, is a schematic diagram of one embodiment of a system for measuring and monitoring client support activity including a network support center computer 38 and a telephone support center computer 36. The system indicated generally at 10 preferably includes local computer 12, a network support center computer 38 and a telephone support center computer 36. Client 14 uses local computer 12. Network support center computer 38 and telephone support center computer may be located within support center 16 or may be located in separate locations. Network support center computer 38 may comprise a server located at a support center which may connect to local computer 12 via network 13. Network support center computer 38 may send and receive electronic communications such as email messages to local computer 12. Further, network support center computer 38 may send and receive computer files such as local client support activity file 20 via network 13. Network support center computer is further connected to database 18 by connection 40 such that information received by network support computer 38 may be sent to database 18. Network support center computer 38 and database 18 may be part of a single system such that connection 40 is a local connection. Alternatively, database 40 may be located remotely from network support center computer 38 such that connection 40 is made over a computer network such as the Internet, an intranet, or another suitable wireline or wireless communication network.

Client 14 may connect to telephone support center computer 36 through connection 15. Connection 15 may comprise any connection allowing client 14 to directly contact a technical support representative at telephone support center. The telephone support center computer may comprise a PC, a workstation, or any other system which includes a memory and a processor which a technical support representative can use to make a record of support center activity.

Local computer 12 further comprises a local client support activity file 20 and a support utility 28. Local client support activity file 20 connects with support utility 28 such that local client support activity file may record and monitor the use of support utility 28. Local client support activity file 20 further comprises files for recording service tag 22, a support activity identification 25, a reference identification 27, and time and date 24. Support activity identification 25 may include an identification of a particular application or program within support utility 28, such a help program 30, diagnostic program 32, and tutorial program 34. Reference identification 27 may comprise an identification of the steps taken within a particular application. For example, if client 14 explores files of frequently asked questions within help program 30, reference identification 27 may record which files of frequently asked question were opened.

In operation, when client 14 experiences a problem with local computer 12 or has questions relating to local computer 12, client 14 may use support utility 28. Client 14 may select and use help program 30, diagnostic program 32, or tutorial program 34. After using one or more of these programs client 14 may find the answer to his particular question or solve his particular problem. In this case client 14 may proceed with his computing activities. When client 14 uses support utility 28, a record of client's activities are created and stored in local client support activity file 20. A record of the service tag 22 identifying local computer 12, time and date 24 the support activity takes place, support activity identification 25, and reference identification 27 is made and stored in local client support activity file 20. When client 14 uses support utility 28 again, another record will be created identifying the time and date 24 and support activity 26 which takes place.

However, in the case that client 14 cannot find a solution to a problem or an answer to a question by using support utility 28, client 14 may contact network support center computer 38 or telephone support center 36 for assistance. Client 14 may connect local computer 12 with network support center computer 38 through network 13 or client 14 may telephone a support center.

When client 14 connects to network support center computer 38, client 14 may send a communication such as an email to network support center computer 38. A technical service representative may respond to the communication and make a record of the support activity in network support center computer 38. When client connects to network support center computer 38, local client support activity file 20 may be uploaded by network support center computer 38. The data contained within local client support activity file 20 and the record of support activity made by a technical support representative may then be transferred and stored in database 18.

When client 14 contacts a telephone support center, a technical service representative can make a record of the support center activity in the telephone support center computer 36. This record may then be stored in database 18. Data stored within database 18 may further be arranged such that local support activity is contained in a separate local client support activity file and a support center activity file. The support center activity file may comprise records of support activity made by technical support representatives relating to telephone support activities and electronic support activities. The data stored in database 18 may be used to evaluate the use and effectiveness of support utility 28.

FIG. 3 is a schematic flow diagram showing a method for measuring and monitoring client support activity including recording local support activity and support center activity. The method includes the step of recording local support activity in a local client support activity file 44 including recording the time and date 46, recording the type of support activity 48, and identifying the local computer 50. Next, the local client support activity file may then be uploaded at a support center 52 and stored in the support center database 54.

Independent from the above steps, support center activity may be recorded 58 including recording the time and date 60, recording the telephone support activity 62, and recording the network support activity 64. Additionally, recording the support center activity may include recording the identity of the client 66. The record of support center activity may then be stored in the support center database 68. The support center database, comprising data from local client support activity as well as network and telephone support activity data, may then be used to evaluate the effectiveness of support center utilities 56.

Although the disclosed embodiments have been described in detail, it should be understood that various changes, substitutions and alterations can be made to the embodiments without departing from their spirit and scope.

What is claimed is:

1. A computer system for measuring and monitoring local client support activity associated with remotely servicing and supporting a client using a local computer comprising:

the local computer having a local client support activity file for recording local client support activity, the local computer operable to selectively connect with a remote support center;

the local client support activity file further operable to be uploaded when the client contacts the remote support center using the local computer;

the remote support center having at least one remote support utility operable to provide client support and operable to receive and store the local client support activity file;

the remote support utility selected from the group consisting of a help program, a tutorial program, and a diagnostic comprising a resource for examining a local computer for failures; and the local client support activity file further comprises:
a service tag for identifying the local computer;
a record of the date and time of the local support activity; and
a record of local support activity.

2. The computer system of claim 1 wherein:

the local computer comprises at least one support utility; and the local client support activity file further operable to record support utility activity.

3. The computer system of claim 2 wherein the local client support utility comprises at least one program selected from the group consisting of a help program, a diagnostic program, and a tutorial program.

4. The computer system of claim 1 wherein the support center computer further comprises a database for collecting uploaded client support activity files.

5. A computer system for measuring and monitoring client service and support activity associated with a local computer comprising:

a client support activity file maintained at the local computer;

a remote support activity file maintained at a remote support center;

a database selectively connected with the local computer and the remote support center having combined information from the local client support activity file and the remote support activity file;

the remote support center providing at least one remote support utility selected from the group consisting of a help program, a tutorial program, and a diagnostic program wherein the diagnostic program comprising a resource for examining a local computer to identify failures; and the local client support activity file further comprising:
a service tag for identifying the local computer;
a record of the date and time of the local support activity; and
a record of local support activity.

6. The computer system of claim 5 wherein the support center activity file further comprises:
an electronic support based portion; and
a telephone support based portion.

7. The computer system of claim 5 wherein the local client support activity file monitors and records use at a local computer of selected portions of programs selected from the group consisting of a help program, a diagnostic program, and a tutorial program.

8. The computer system of claim 7 further comprising:

the local client support activity file further operable to be uploaded by a support center computer selectively connected to the local client support activity file; and the support center computer further connected to the database such that data from the local client support activity file may be transferred into the database.

9. The computer system of claim 8 wherein the local client support activity file is selectively operable to record local client support activity.

10. The computer system of claim 8 further comprising a network for selectively connecting the local client support activity file with the remote support center computer.

11. A method for tracking support activity associated with a local computer comprising the steps of:

recording local support activity at a local computer in a local client support activity file, the local client support activity file further comprising:
a service tag for identifying the local computer;
a record of the date and time of the local support activity; and
a record of local support activity;

uploading the local client support activity file at a remote support center; and providing remote support to the local computer including providing at least one remote support utility selected from the group consisting of a help program, a tutorial program, and a diagnostic program wherein the diagnostic program comprising a resource for examining a local computer to identify failures and inefficiencies.

12. The method of claim 11 wherein the step of recording local support activity further comprises identifying the local computer.

13. The method of claim 11 wherein the step of uploading the local client support activity file further comprises:

uploading the local client support activity file at the remote support center; and storing the local client support activity file in a remote support center database.

14. The method of claim 13 further comprising using the remote support center database to evaluate the effectiveness of local support utilities.

15. The method of claim 13 further comprising:

recording the remote support center activity in a support center activity file; and storing the remote support center activity file in the support center database.

16. The method of claim 15 wherein the step of recording remote support center activity further comprises:

recording the time and date of remote support activity;
recording telephone support activity;
recording electronic internet support activity; and
recording the identity of a client who is given support.

17. The method of claim 16 further comprising using the support center database to evaluate the effectiveness of local support utilities and support center activities.

* * * * *